United States Patent
Konishi et al.

(10) Patent No.: US 10,711,840 B2
(45) Date of Patent: Jul. 14, 2020

(54) METHOD FOR MANUFACTURING WHEEL BEARING APPARATUS

(71) Applicant: NTN CORPORATION, Osaka (JP)

(72) Inventors: Ryo Konishi, Shizuoka (JP); Hyuuga Suzuki, Shizuoka (JP)

(73) Assignee: NTN CORPORATION, Osaka (JP)

(*) Notice: Subject to any disclaimer, the term of this patent is extended or adjusted under 35 U.S.C. 154(b) by 127 days.

(21) Appl. No.: 15/762,755

(22) PCT Filed: Sep. 13, 2016

(86) PCT No.: PCT/JP2016/077003
§ 371 (c)(1),
(2) Date: Mar. 23, 2018

(87) PCT Pub. No.: WO2017/056973
PCT Pub. Date: Apr. 6, 2017

(65) Prior Publication Data
US 2018/0202493 A1    Jul. 19, 2018

(30) Foreign Application Priority Data

Sep. 28, 2015  (JP) .................... 2015-189882

(51) Int. Cl.
*F16C 19/18* (2006.01)
*F16C 33/64* (2006.01)

(52) U.S. Cl.
CPC .............. *F16C 33/64* (2013.01); *F16C 19/18* (2013.01); *F16C 19/186* (2013.01); *F16C 2226/52* (2013.01); *F16C 2326/02* (2013.01)

(58) Field of Classification Search
CPC ........ F16C 33/64; F16C 19/186; F16C 19/18; F16C 2226/52; F16C 2326/02; B24B 19/06
See application file for complete search history.

(56) References Cited

U.S. PATENT DOCUMENTS

2007/0081752 A1   4/2007   Kametaka et al.
2016/0082771 A1   3/2016   Kametaka et al.

FOREIGN PATENT DOCUMENTS

JP    2005-140181    6/2005
JP    2005-180524    7/2005

(Continued)

OTHER PUBLICATIONS

International Search Report (ISR) dated Dec. 20, 2016 in International (PCT) Application No. PCT/JP2016/077003.

(Continued)

*Primary Examiner* — Sarang Afzali
*Assistant Examiner* — Ruth G Hidalgo-Hernandez
(74) *Attorney, Agent, or Firm* — Wenderoth, Lind & Ponack, L.L.P.

(57) ABSTRACT

Provided is a method of manufacturing a bearing device for a wheel including an inner ring that is fixed to a hub wheel by a caulking portion formed by plastically deforming an end portion of the hub wheel in a radially outward direction. The inner ring includes a raceway groove formed by grinding. A backing plate, which is driven to rotate about an axis thereof, is pressed on a large end surface of the inner ring. The grinding is performed by rotating the inner ring by rotation of the backing plate. A pressing position of the backing plate is apart from a radially-outer-side chamfered portion and a radially-inner-side chamfered portion of the large end surface of the inner ring.

6 Claims, 8 Drawing Sheets

(56) References Cited

FOREIGN PATENT DOCUMENTS

| JP | 3855315 | 12/2006 |
|---|---|---|
| JP | 2009-168236 | 7/2009 |

OTHER PUBLICATIONS

International Preliminary Report on Patentability and Written Opinion of the International Searching Authority dated Apr. 3, 2018 in International (PCT) Application No. PCT/JP2016/077003.

METHOD FOR MANUFACTURING WHEEL BEARING APPARATUS

TECHNICAL FIELD

The present invention relates to a method of manufacturing a bearing device for a wheel.

BACKGROUND ART

As illustrated in FIG. 14A and FIG. 14B, a bearing device for a wheel includes a hub wheel 2, an inner ring 3, an outer ring 4, and a plurality of rolling elements 5. A flange 6 configured to support a wheel is formed on an outer end portion of an outer peripheral surface of the hub wheel 2. Further, a first inner ring raceway 7 is formed on a middle portion of a shaft section 11 of the hub wheel 2, and a step portion 8 having a small outer diameter dimension is formed at an inner end portion of the shaft section 11 of the hub wheel 2.

The inner ring 3 having a second inner ring raceway 9 formed on an outer peripheral surface thereof is externally fitted to the step portion 8. A caulking cylindrical portion 17 as illustrated in FIG. 14A protrudes at the inner end portion of the shaft section 11 of the hub wheel 2. A portion of the caulking cylindrical portion 17 protruding inwardly from an inner end surface 10 of the inner ring 3 is bent by a caulking jig to an outer side in a diameter direction. In this manner, a caulking portion 16 as illustrated in FIG. 14B is formed, thereby being capable of sandwiching the inner ring 3 between the caulking portion 16 and a stepped surface 12 of the step portion 8.

Further, a first outer ring raceway 13 and a second outer ring raceway 14 are formed on an inner peripheral surface of the above-mentioned outer ring 4 so as to be opposed to the first inner ring raceway 7 and the second inner ring raceway 9, respectively. The plurality of rolling elements 5 are provided between the first inner ring raceway 7 and the first outer ring raceway 13, and the plurality of rolling elements 5 are provided between the second inner ring raceway 9 and the second outer ring raceway 14.

Hitherto, there have been proposed various methods and devices such as a method of manufacturing a rolling bearing unit for supporting a wheel, which achieves less formation of a crack or the like in a caulking portion (Patent Literature 1), a bearing unit for supporting a wheel, which is capable of reducing an amount of increase in diameter of an inner ring accompanied with formation of a caulking portion (Patent Literature 2), and a method of caulking a rolling bearing unit for supporting a wheel, which is capable of preventing distortion of an inner ring and formation of a crack in the inner ring when caulking is performed (Patent Literature 3).

In the method and the device described in Patent Literature 1 and Patent Literature 2, increase in inner diameter (hoop stress) during caulking is reduced by devising a chamfered shape of a radially inner surface of the inner ring. Thus, the inner ring is prevented from fracturing after caulking is performed. That is, a shaft of a hub wheel is expanded during caulking, and the expansion involves increase in diameter of the inner ring. Accordingly, the radially inner surface on a large end surface side of the inner ring, which is to be increased in diameter to a large degree during caulking, is formed into a tapered shape or a stepped shape. With this configuration, the increase in diameter of the inner ring (hoop stress) is suppressed.

Further, in Patent Literature 3, there is described the manufacturing method in which the increase in diameter of the inner ring is suppressed by restraining an outer diameter of the inner ring by a jig during caulking.

CITATION LIST

Patent Literature 1: JP 3855315 B
Patent Literature 2: JP 2009-168236 A
Patent Literature 3: JP 2005-180524 A

SUMMARY OF INVENTION

Technical Problem

Incidentally, a dent may be formed in some portions of the inner ring 3 depending on handling of the inner ring in steps performed until assembly. That is, a dent may be formed in a large end surface 3a (see FIG. 5) of the inner ring 3. A dent is formed particularly in an edge 21 (see FIG. 6) between the large end surface 3a and a radially-outer-surface-side chamfered portion 20, or in an edge 23 (see FIG. 7) between the large end surface 3a and a radially-inner-surface-side chamfered portion 22 because the edge 21 or the edge 23 is liable to hit against an external interference object. In this case, the dent is formed as an uneven portion 24 as illustrated in FIG. 12. That is, the uneven portion 24 includes a pair of projecting portions 24a and 24a, and a recessed portion 24b formed between the projecting portions 24a and 24a.

When a groove is to be formed in the inner ring by grinding, as illustrated in FIG. 8, the large end surface 3a of the inner ring 3 is pressed against a backing plate 25. The backing plate 25 includes a ring-shaped pressing surface 25a against which the large end surface 3a of the inner ring 3 is pressed. Incidentally, the backing plate 25 is basically designed for each model specification. However, an approximate product number is sometimes used for multiple model specifications in order to reduce tool cost and management steps.

When the large end surface 3a of the inner ring 3 is pressed against the backing plate 25, the pressing surface 25a may be positioned on the radially outer surface side of the large end surface 3a as illustrated in FIG. 8, or the pressing surface 25a may be positioned on the radially inner surface side of the large end surface 3a as illustrated in FIG. 10 and FIG. 11. That is, under a state illustrated in FIG. 8, the pressing surface 25a interferes with the edge 21 between the large end surface 3a and the radially-outer-surface-side chamfered portion 20 as illustrated in FIG. 9. Under a state illustrated in FIG. 10 and FIG. 11, the pressing surface 25a interferes with the edge 23 between the large end surface 3a and the radially-inner-surface-side chamfered portion 22.

In the case illustrated in FIG. 8, the case illustrated in FIG. 10, and the like, the pressing surface 25a of the backing plate 25 is brought into contact with the uneven portion 24 that is formed at the time of formation of the dent as illustrated in FIG. 12. The inner ring 3 is rotated by rotating the backing plate 25 about an axis thereof. In this manner, grinding is performed on the inner ring 3.

However, in a case where the dent is formed in the inner ring 3, when a raceway groove is formed in the inner ring 3 by grinding, stress is repeatedly applied to the uneven portion 24, with the result that a crack may be formed as illustrated in FIG. 13. Accordingly, even when formation of a crack or the like in the caulking portion, and increase in diameter of the inner ring 3 due to caulking can be prevented as in the cases of Patent Literature 1 to Patent Literature 3, formation of the dent in the inner ring 3 cannot be prevented. In the case where the dent is formed in the inner ring 3 as described above, when the raceway groove is formed in the inner ring by grinding, a crack may be formed to cause a fracture of the inner ring. Particularly when caulking is performed as processing of the bearing device for a wheel or hoop stress is applied, a risk of a fracture of the inner ring becomes higher.

Therefore, the present invention provides a method of manufacturing a bearing device for a wheel, which is capable of preventing formation of a crack resulting from a dent in an inner ring and preventing degradation of processing accuracy.

Solution to Problem

The present invention provides a method of manufacturing a bearing device for a wheel comprising an inner ring that is fixed to a hub wheel by a caulking portion formed by plastically deforming an end portion of the hub wheel in a radially outward direction, the method comprising performing grinding to form a raceway groove in the inner ring while the inner ring is rotated by rotation of a backing plate, which is driven to rotate about an axis thereof, under a state in which the backing plate is pressed on a large end surface of the inner ring, wherein a pressing position of the backing plate is apart from a radially-outer-side chamfered portion and a radially-inner-side chamfered portion of the large end surface of the inner ring.

According to the method of manufacturing a bearing device for a wheel of the present invention, the pressing position of the backing plate is apart from the radially-inner-side chamfered portion and the radially-outer-side chamfered portion of the large end surface of the inner ring. Accordingly, the backing plate can be pressed on a position displaced from a region in which a dent is liable to be formed.

The backing plate comprises a pressing ring portion, and is pressed on the large end surface of the inner ring at a circular end surface of the pressing ring portion. With this configuration, the large end surface of the inner ring can be stably pressed on the backing plate.

It is preferred that the pressing position of the backing plate on the large end surface of the inner ring be radially inwardly apart from the radially-outer-side chamfered portion of the large end surface of the inner ring by a distance of 0.5 mm or more, and be radially outwardly apart from the radially-inner-side chamfered portion of the large end surface of the inner ring by a distance of 0.5 mm or more. Particularly, it is preferred that the pressing position of the backing plate on the large end surface of the inner ring be radially inwardly apart from the radially-outer-side chamfered portion of the large end surface of the inner ring by a distance of 1.0 mm or more, and be radially outwardly apart from the radially-inner-side chamfered portion of the large end surface of the inner ring by a distance of 1.0 mm or more.

Advantageous Effects of Invention

According to the present invention, the backing plate can be pressed on the position displaced from the region in which a dent is liable to be formed. Thus, formation of a crack in the inner ring due to pressing of the backing plate, and reduction (degradation) of grinding accuracy can be prevented. Accordingly, the inner ring is stably fixed to the hub wheel by the caulking portion formed by plastically deforming the end portion of the hub wheel in the radially outward direction.

DESCRIPTION OF EMBODIMENTS

Figure 4:
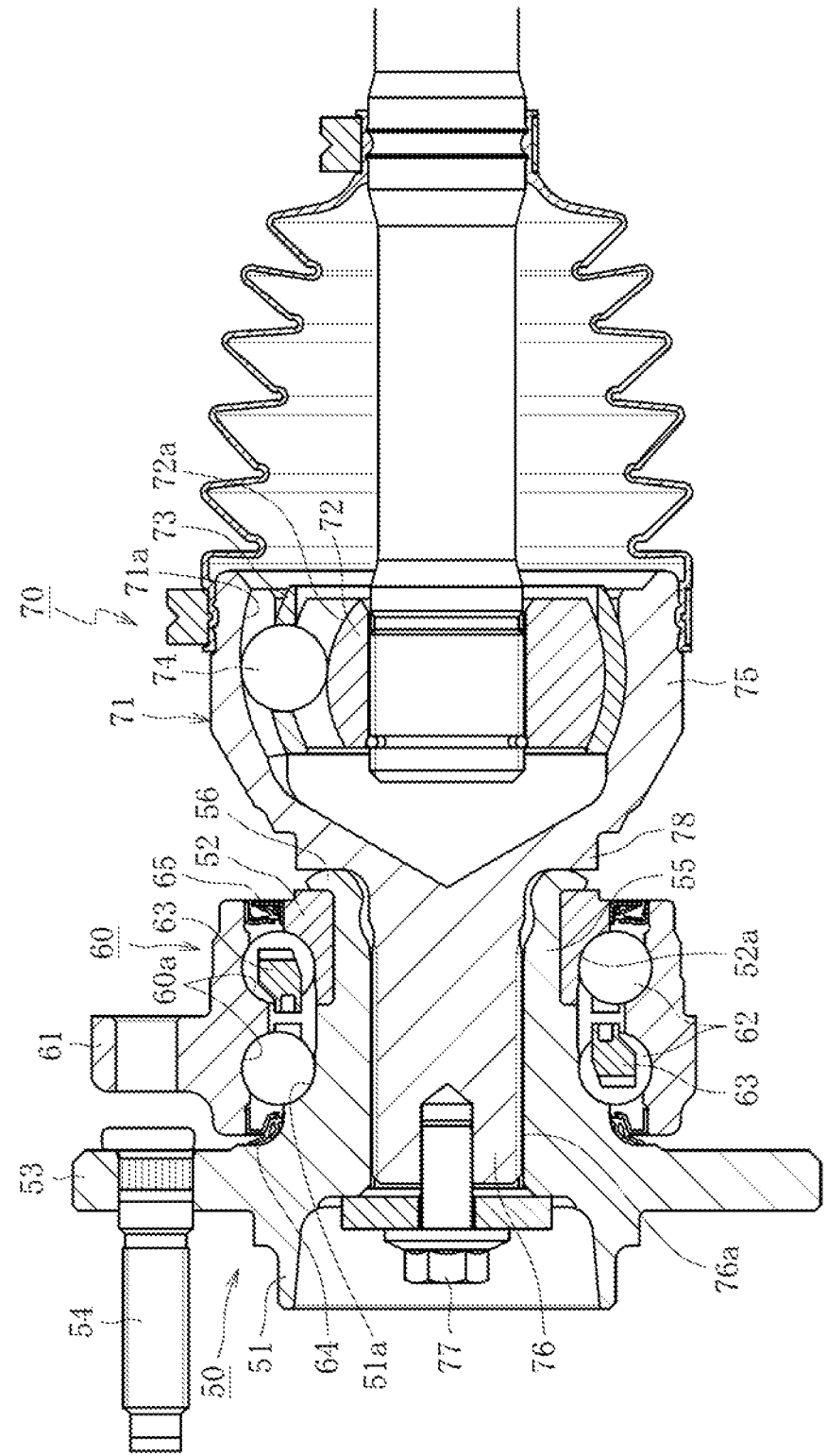
FIG. 4 is a sectional view for illustrating the bearing device for a wheel according to the present invention.
Figure 5:
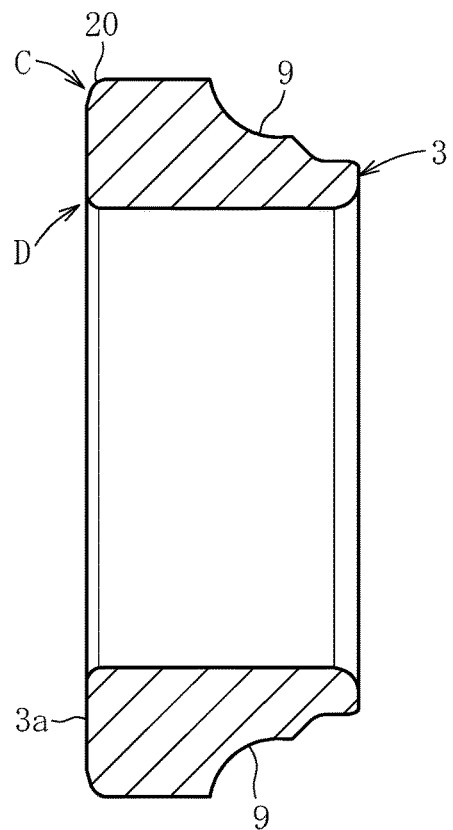
FIG. 5 is a sectional view for illustrating the inner ring of the bearing device for a wheel.
Figure 6:
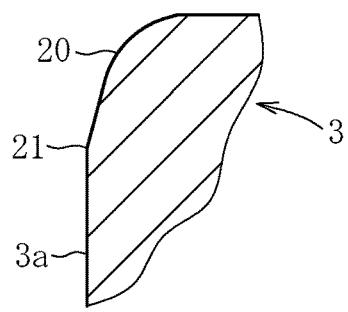
FIG. 6 is an enlarged sectional view for illustrating a portion C of FIG. 5.
Figure 7:
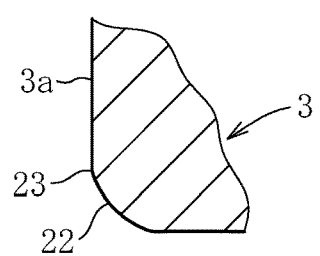
FIG. 7 is an enlarged sectional view for illustrating a portion D of FIG. 5.
Figure 8:
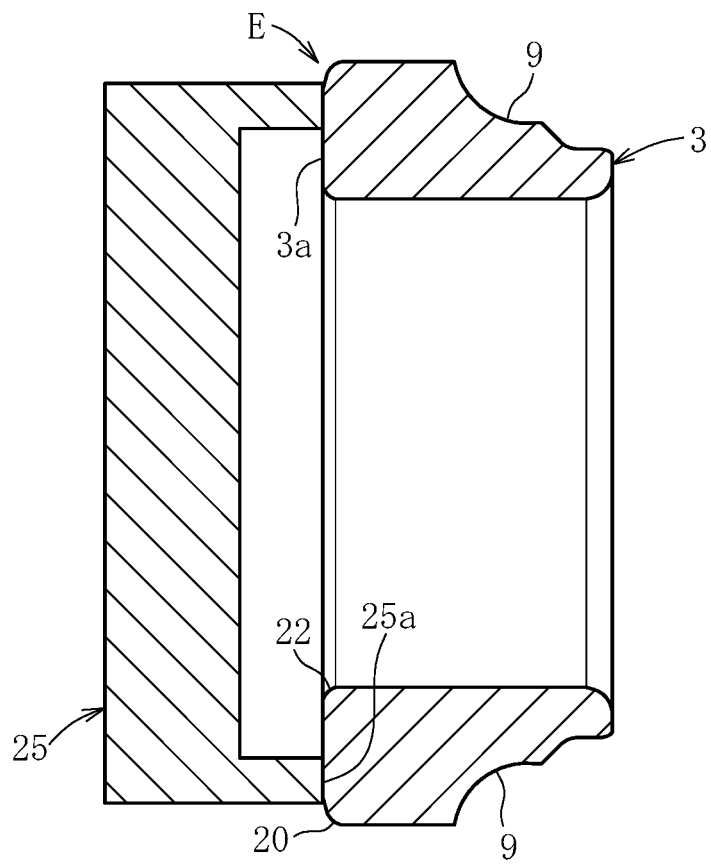
FIG. 8 is a sectional view for illustrating a state in which a related-art backing plate is pressed against an inner ring.
Figure 9:
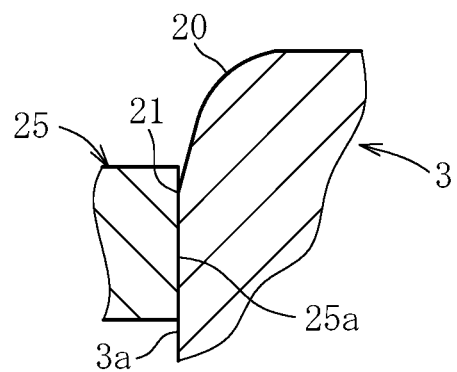
FIG. 9 is an enlarged sectional view for illustrating a portion E of FIG. 8.
Figure 10:
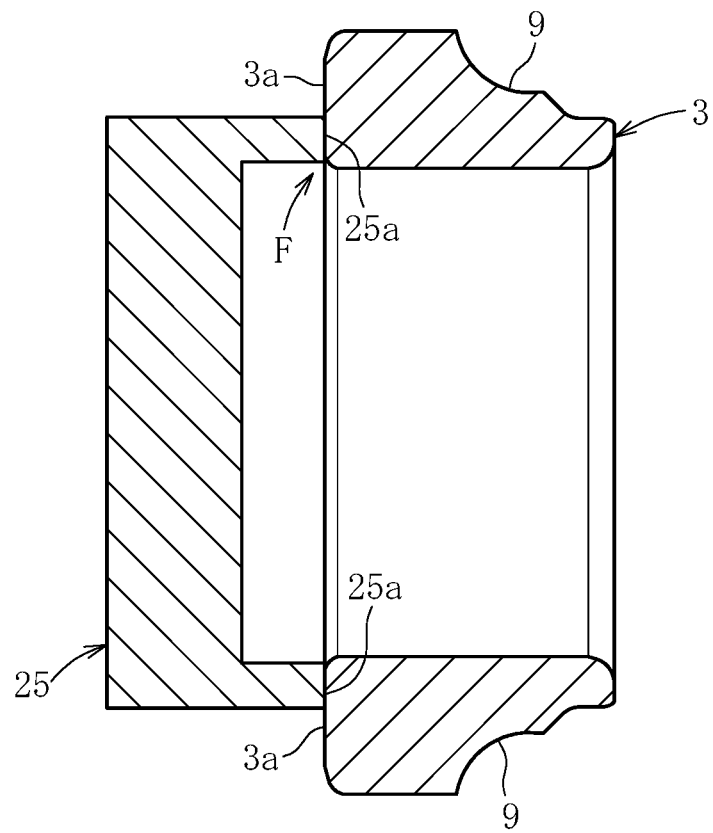
FIG. 10 is a sectional view for illustrating a state in which another related-art backing plate is pressed against the inner ring.
Figure 11:
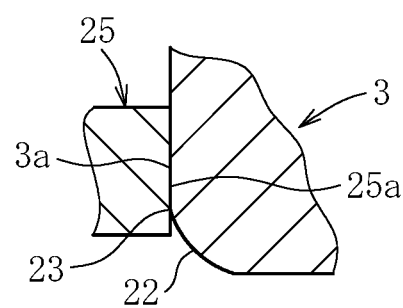
FIG. 11 is an enlarged sectional view for illustrating a portion F of FIG. 10.

Now, an embodiment of the present invention is described with reference to FIG. 1 to FIG. 4. FIG. 4 is an illustration of a bearing device for a wheel. The bearing device for a wheel comprises an inner member 50, an outer member 60, and a constant velocity universal joint 70, which are formed into a unit. The inner member 50 comprises a hub wheel 51 and an inner ring 52. The inner ring 52 is a separate member which is press-fitted to the hub wheel 51. The hub wheel 51 integrally comprises a wheel mounting flange 53 to which a wheel (not shown) is mounted. Hub bolts 54 configured to fix the wheel are embedded at equiangular positions in the wheel mounting flange 53. The inner ring 52 is press-fitted to a small-diameter step portion 55 formed in the hub wheel 51. In addition, a caulking portion 56 is formed by plastically deforming an end portion of the small-diameter step portion 55 radially outward, and is configured to prevent the inner ring 52 from being removed in an axial direction.

The outer member 60 integrally comprises a vehicle body mounting flange 61. The vehicle body mounting flange 61 is formed on an outer periphery of the outer member 60, and allows a vehicle body (not shown) to be mounted thereon. Double-row outer rolling surfaces 60a are formed on an inner periphery of the outer member 60. Meanwhile, the inner member 50 has inner rolling surfaces (raceway grooves) 51a and 52a opposed to the outer rolling surfaces 60a of the outer member 60. The inner rolling surfaces 51a and 52a are integrally formed on the hub wheel 51 and the inner ring 52, respectively. Further, double-row rolling elements (balls) 62 roll between the inner rolling surfaces 51a and 52a and the outer rolling surfaces 60a. The above-mentioned configuration is a so-called third-generation bearing device for a wheel. The rolling elements 62 in respective rows are retained by a retainer 63 at predetermined intervals. Further, seals 64 and 65 are mounted to end portions of the outer member 60, and are configured to prevent leakage of lubricating grease sealed in a bearing, and prevent entry of rainwater, dust, and the like from an outside of the bearing into the bearing.

The constant velocity universal joint 70 comprises an outer joint member 71, a joint inner ring 72, a cage 73, and torque transmitting balls 74. The outer joint member 71 comprises a cup-shaped mouth section 75, and a shaft section 76 extending from the mouth section 75 in the axial direction. Track grooves 71a each having a curved shape extending in the axial direction are formed in an inner periphery of the mouth section 75. Meanwhile, track grooves 72a each having a curved shape are formed in an outer periphery of the joint inner ring 72 so as to be opposed to the track grooves 71a. A curvature center of each of the track grooves 71a and a curvature center of each of the track grooves 72a are axially offset to each other from a joint center by equal distances. All the torque transmitting balls 74 are retained by the cage 73 on the same plane. Therefore, at any operating angle, the torque transmitting balls 74 received between both the track grooves 71a and 72a are always retained on a bisector plane of the operating angle. Thus, constancy of velocity of the joint is secured.

The shaft section 76 of the outer joint member 71 is fitted to the hub wheel 51 through intermediation of a serration 76a so as to be capable of transmitting torque between the outer joint member 71 and the hub wheel 51. Further, under a state in which the caulking portion 56 and a shoulder portion 78 of the outer joint member 71 are held in abutment against each other, the inner member 50 and the outer joint member 71 are removably fastened to each other by a fixing bolt 77.

Figure 1:
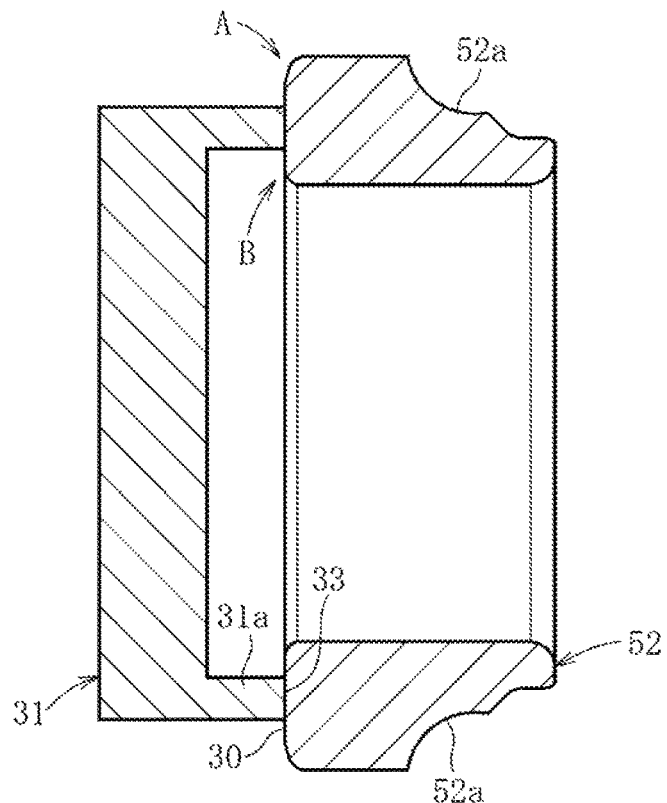
FIG. 1 is a sectional view for illustrating a state in which a backing plate is pressed against an inner ring of a bearing device for a wheel according to the present invention.
Figure 2:
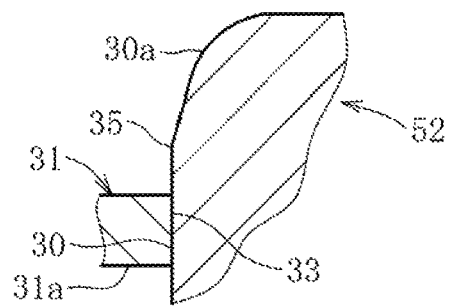
FIG. 2 is an enlarged sectional view for illustrating a portion A of FIG. 1.
Figure 3:
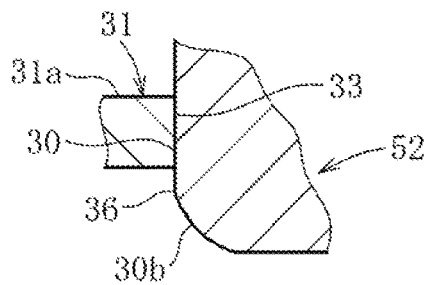
FIG. 3 is an enlarged sectional view for illustrating a portion B of FIG. 1.

Incidentally, when grinding is performed on the inner rolling surface (raceway groove) 52a of the inner ring 52, as illustrated in FIG. 1, under a state in which a backing plate 31, which is driven to rotate about an axis thereof, is pressed on a large end surface 30, grinding is performed while the inner ring 52 is rotated by rotation of the backing plate 31.

The backing plate 31 comprises a pressing ring portion 31a, and is pressed on the large end surface 30 of the inner ring 52 at a circular end surface 33 of the ring portion 31a. At this time, a pressing position of the backing plate 31 is apart from a radially-outer-side chamfered portion 30a and a radially-inner-side chamfered portion 30b of the large end surface 30 of the inner ring 52.

Specifically, it is preferred that the pressing position of the backing plate 31 on the large end surface 30 of the inner ring 52 (position of the circular end surface 33) be radially inwardly apart from the radially-outer-side chamfered portion 30a of the large end surface 30 of the inner ring 52 (that is, from an edge 35 between the large end surface 30 and the radially-side chamfered portion 30a of the inner ring 52) by a distance of 0.5 mm or more, and be radially outwardly apart from the radially-inner-side chamfered portion 30b of the large end surface 30 of the inner ring 52 (from an edge 36 between the large end surface 30 and the radially-inner-surface-side chamfered portion 30b of the inner ring 52) by a distance of 0.5 mm or more. It is particularly preferred that the pressing position of the backing plate 31 on the large end surface 30 of the inner ring 52 be radially inwardly apart from the radially-outer-side chamfered portion 30a of the large end surface 30 of the inner ring 52 by a distance of 1.0 mm or more, and be radially outwardly apart from the radially-inner-side chamfered portion 30b of the large end surface 30 of the inner ring 52 by a distance of 1.0 mm or more.

As described above, the pressing position of the backing plate 31 is apart from the radially-outer-side chamfered portion 30a and the radially-inner-side chamfered portion 30b of the large end surface 30 of the inner ring 52. Thus, the backing plate 31 can be pressed on a position displaced from a region in which a dent is liable to be formed. In this case, the region in which a dent is liable to be formed refers to the edge 35 between the large end surface 30 and the radially-outer-side chamfered portion 30a of the inner ring 52 or a vicinity of the edge 35, and refers to the edge 36 between the large end surface 30 and the radially-inner-side chamfered portion 30b of the inner ring 52 or a vicinity of the edge 36.

Figure 12:
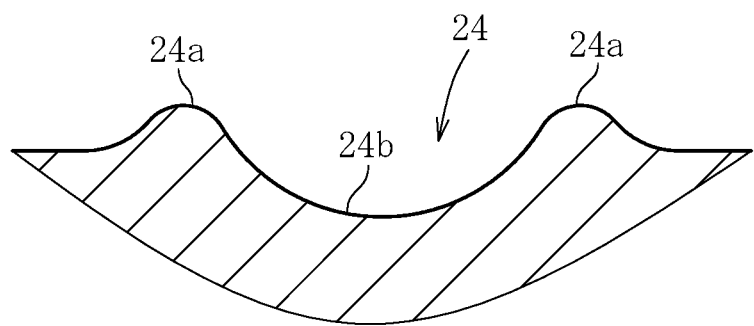
FIG. 12 is a sectional view for illustrating a dent.
Figure 13:
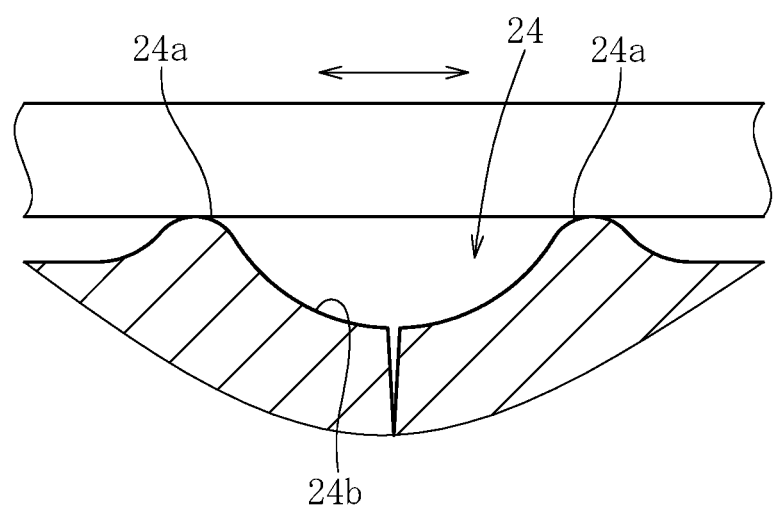
FIG. 13 is a sectional view for illustrating a state in which a backing plate is pressed against an inner ting having the dent.
Figure 14A:
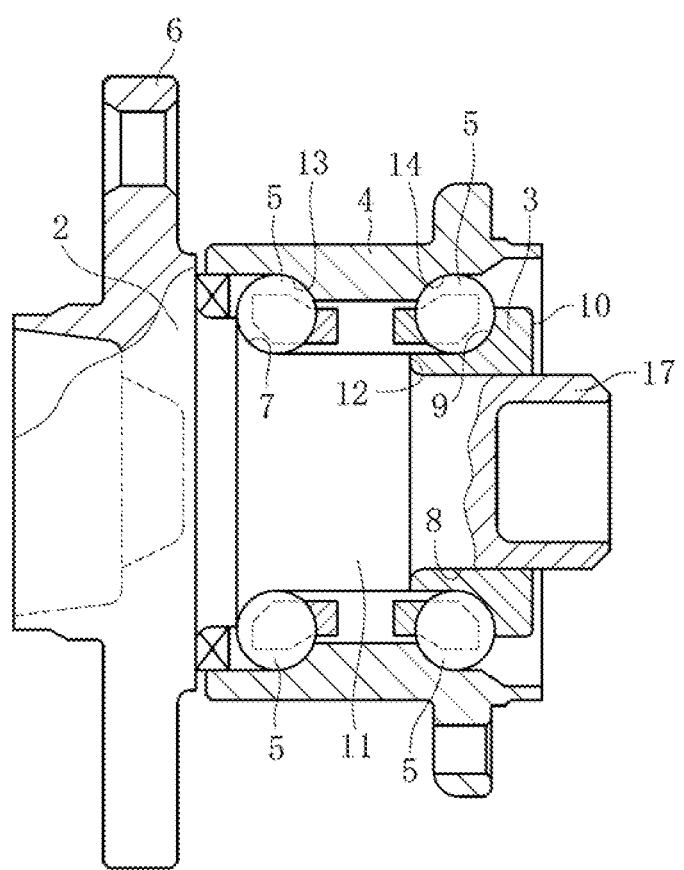
FIG. 14A is a sectional view for illustrating a related-art bearing device for a wheel before caulking is performed.
Figure 14B:
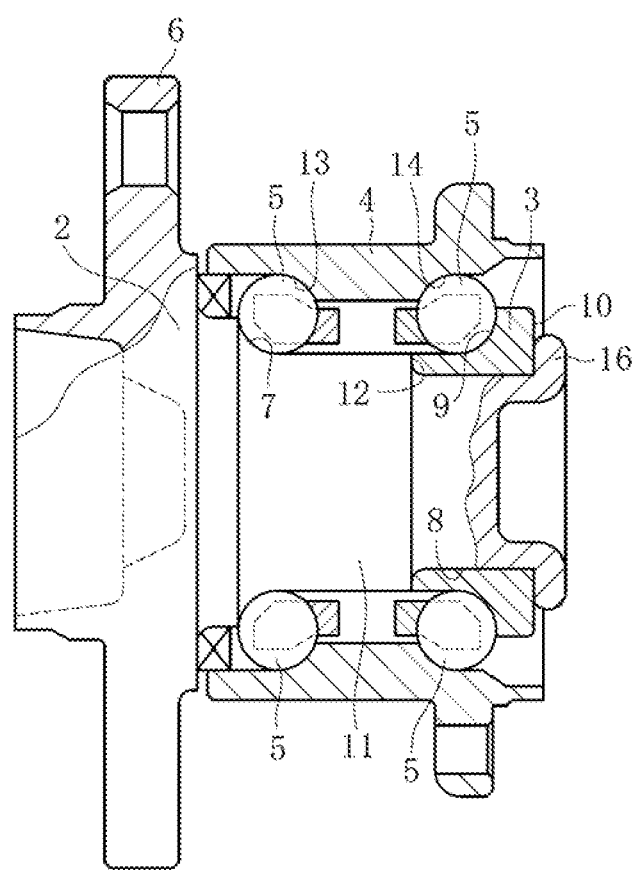
FIG. 14B is a sectional view for illustrating the related-art bearing device for a wheel after caulking is performed.

Therefore, the circular end surface 33 of the backing plate 31 is not brought into contact with an uneven portion 24 that is formed at the time of formation of the dent as illustrated in FIG. 12. Thus, a crack due to pressing of the backing plate 31, a fracture of the inner ring, and the like can be avoided.

The pressing position of the backing plate (position of the circular end surface 33) is radially inwardly apart from the radially-outer-side chamfered portion 30a of the large end surface 30 of the inner ring 52 by a distance of 0.5 mm or more, and is radially outwardly apart from the radially-inner-side chamfered portion 30b of the large end surface 30 of the inner ring 52 by a distance of 0.5 mm or more. Thus, the circular end surface 33 of the backing plate 31 is stably kept out of contact with the uneven portion 24 formed at the time of formation of the dent. Particularly when the pressing position of the backing plate is radially inwardly apart from the radially-outer-side chamfered portion 30a of the large end surface 30 of the inner ring 52 by a distance of 1.0 mm or more, and is radially outwardly apart from the radially-inner-side chamfered portion 30b of the large end surface 30 of the inner ring 52 by a distance of 1.0 mm or more, the circular end surface 33 of the backing plate 31 can be more stably kept out of contact with the uneven portion 24.

As described above, in the present invention, the backing plate 31 can be pressed on the position displaced from the region in which a dent is liable to be formed. A crack of the inner ring 52 formed due to pressing of the backing plate 31, a fracture of the inner ring, and reduction (degradation) of grinding accuracy can be prevented. Accordingly, the inner ring 52 is stably fixed to the hub wheel 51 by the caulking portion 56 formed by plastically deforming the end portion of the hub wheel 51 in a radially outward direction.

The embodiment of the present invention is described above, but the present invention is not limited to the above-mentioned embodiment. Various modifications can be made thereto. In the above-mentioned embodiment, the balls are used as the rolling elements, but tapered rollers may be used instead.

INDUSTRIAL APPLICABILITY

As the bearing device for a wheel, a bearing device for a driving wheel, or a bearing device for a driven wheel may be used.

REFERENCE SIGNS LIST 30 large end surface
30a chamfered portion 30b chamfered portion
31 backing plate
31a pressing ring portion
33 circular end surface
51 hub wheel
52 inner ring
52a inner rolling surface
56 caulking portion
60 outer member
60a outer rolling surface

The invention claimed is:

1. A method of manufacturing a bearing device for a wheel comprising an inner ring that is fixed to a hub wheel by a caulking portion formed by plastically deforming an end portion of the hub wheel in a radially outward direction, the method comprising performing grinding to form a raceway groove in the inner ring while the inner ring is rotated by rotation of a backing plate, which is driven to rotate about an axis thereof, under a state in which the backing plate is pressed on a large end surface of the inner ring,
wherein a pressing position of the backing plate on the large end surface of the inner ring is radially inwardly apart from a radially-outer-side chamfered portion of the large end surface of the inner ring by a distance of 0.5 mm or more, and
wherein the pressing position of the backing plate on the large end surface of the inner ring is radially outwardly apart from a radially-inner-side chamfered portion of the large end surface of the inner ring by a distance of 0.5 mm or more.

2. The method of manufacturing a bearing device for a wheel according to claim 1, wherein the backing plate comprises a pressing ring portion, and is pressed on the large end surface of the inner ring at a circular end surface of the pressing ring portion.

3. The method of manufacturing a bearing device for a wheel according to claim 2, wherein the pressing position of the backing plate on the large end surface of the inner ring is radially inwardly apart from the radially-outer-side chamfered portion of the large end surface of the inner ring by a distance of 1.0 mm or more.

4. The method of manufacturing a bearing device for a wheel according to claim 2, wherein the pressing position of the backing plate on the large end surface of the inner ring is radially outwardly apart from the radially-inner-side chamfered portion of the large end surface of the inner ring by a distance of 1.0 mm or more.

5. The method of manufacturing a bearing device for a wheel according to claim 1, wherein the pressing position of the backing plate on the large end surface of the inner ring is radially inwardly apart from the radially-outer-side chamfered portion of the large end surface of the inner ring by a distance of 1.0 mm or more.

6. The method of manufacturing a bearing device for a wheel according to claim 1, wherein the pressing position of the backing plate on the large end surface of the inner ring is radially outwardly apart from the radially-inner-side chamfered portion of the large end surface of the inner ring by a distance of 1.0 mm or more.

* * * * *